Aug. 16, 1960     G. E. W. LEWIN     2,948,916

PIVOT BEARING FOR HORIZONTAL AND VERTICAL PIVOTED WINDOWS

Filed April 2, 1957     3 Sheets-Sheet 1

INVENTOR.
Gunnar E.W. Lewin

BY Darby & Darby

ATTORNEYS

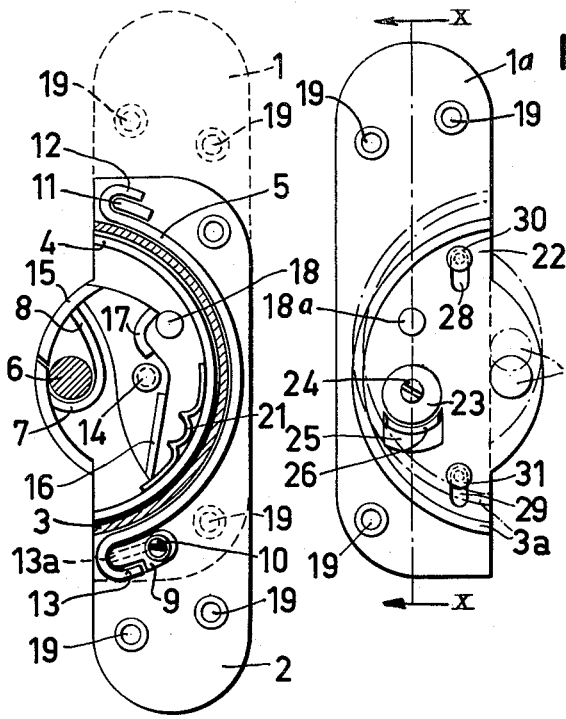

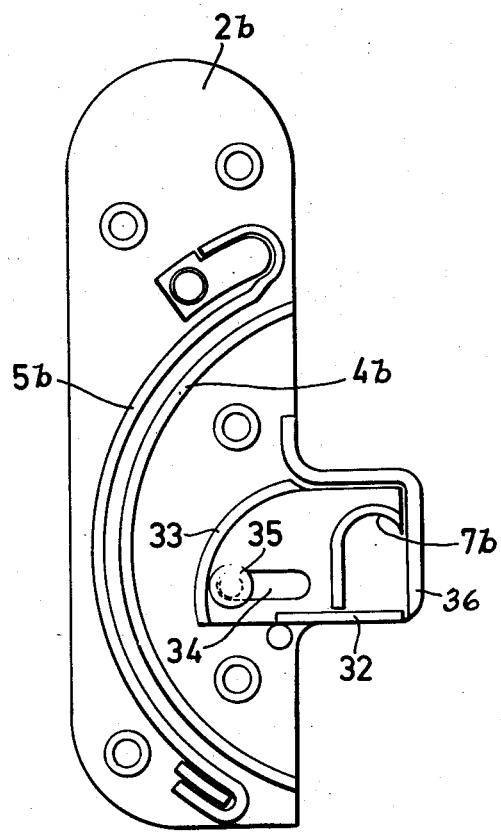

United States Patent Office 2,948,916
Patented Aug. 16, 1960

2,948,916

PIVOT BEARING FOR HORIZONTAL AND VERTICAL PIVOTED WINDOWS

Gunnar Erik Werner Lewin, Viggbyholm, Sweden, assignor to Aktiebolaget Atvidabergs Butiksinredningar, Stockholm, Sweden, a joint-stock company of Sweden Filed Apr. 2, 1957, Ser. No. 650,248

Claims priority, application Sweden May 16, 1956

7 Claims. (Cl. 16—140)

The present invention relates to bearings for horizontally or vertically suspended windows, which bearing consists of two fittings turnable in respect of each other, one fitting being secured to the window frame and the other one to the window sash, the first fitting having a semicircular flange and the second fitting having two substantially concentric semicircular flanges, between which the flange of the other fitting moves. The invention is substantially characterized in that at least one of the semicircular flanges is detachably fixed to the fitting, preferably the fitting of the window sash, and that the flanges are arranged to engage each other in such a manner that they support the window sash completely, when the latter is swung from closed position to a predetermined open position, for example 120° open position, and vice versa when the window sash is swung towards closed position, and that a stud is attached to the fitting of the window frame and is arranged to be inserted in an outwardly open arcuate bearing surface of the fitting of the sash and together with the flanges carry the sash when the latter is swung for example from 120° to 180°, whereafter the stud alone carries the sash.

The adjustable flange can be attached at one end or both ends by means of an adjusting screw or the like. The open portion of the bearing surface may be upwardly directed when the window is closed and the sash is supported by the semicircular flanges, and downwardly directed when the sash has been swung at least 180° and is carried by the studs. A rocking arm or the like may be arranged to be automatically actuated by a device, for example a projection or a pin in the fitting of the window frame, when the sash is swung towards closed position, so that the said rocking arm or the like closes the opening, and possibly opens it, when the sash is swung towards open position. The fitting with the stud may be provided with a plate carrying the stud and which has a flange corresponding to the semicircular flange, and with devices for adjusting the plate with the flange on different levels, the purpose being to effect an after-adjustment of the window.

Figure 1:
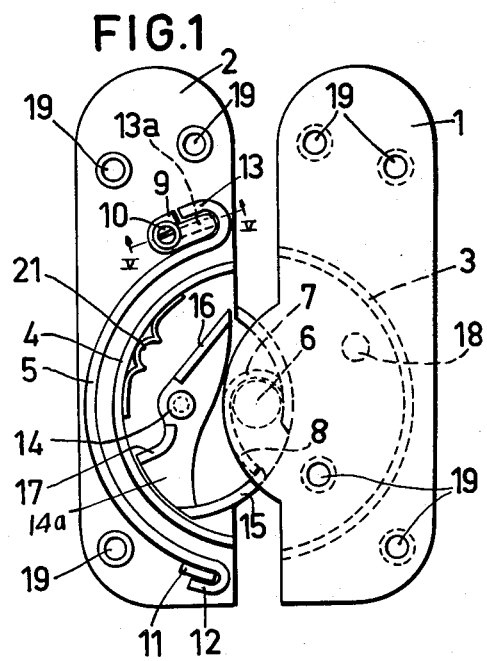
Figure 4:
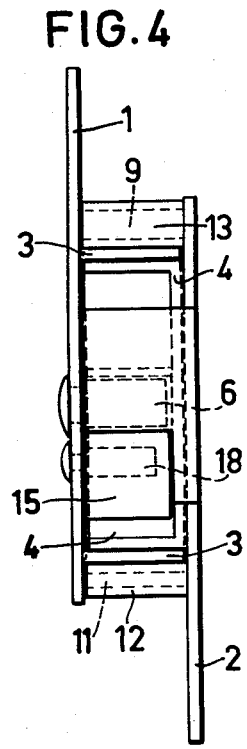
Figure 2:
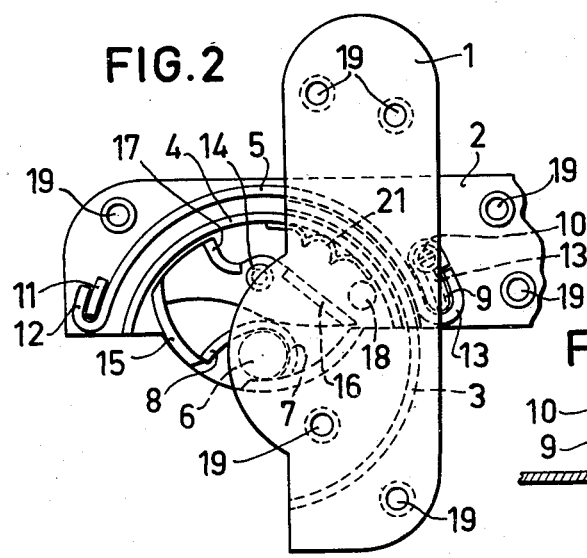
Figure 5:
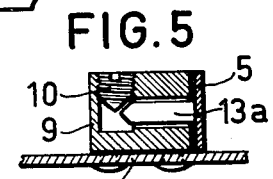

Fittings according to the invention are illustrated in the accompanying drawings in which, Fig. 1 is a side elevation of a preferred form of the two fittings, the sash fitting being swung 180° from closed position; Fig. 2 is a view similar to Fig. 1, the sash fitting however being swung 90° from closed position; Fig. 3 is a gain a similar view showing the two fittings in complete engagement with each other, that is, corresponding to the position in which the window is closed. For the sake of clearness the plate of the fitting 1 is indicated by dashed lines; Fig. 4 is a front elevation of the two fittings which are in the position shown in Fig. 3; Fig. 5 is a section along the line V—V in Fig. 1; Figs. 6, 7, and 8 show, on a smaller scale, the position of the window sash in relation to the window frame in the positions of the fittings as shown in Figs. 1, 2, and 3. Fig. 9 is a side elevational view of a broad embodiment of the window frame fitting; Fig. 10 is a section along the line X—X in Fig. 9, and Fig. 11 is a side elevational view of a modification of the sash fitting.

Referring now to the drawings reference numeral 1 designates a fitting, in the embodiment shown to be attached to the window frame, and 2 designates another fitting to be attached to the window sash, which two fittings form one of the two pivot bearings which support the window sash. To the fitting 1 a semicircular flange 3 is rigidly connected, and to the fitting 2 two concentric semicircular flanges 4 and 5, spaced somewhat from each other, are attached, between which the flange 3 moves against the action of friction. A stud 6 is provided on the fitting 1. A seat 7 for the stud 6 is provided on the fitting 2, against which seat the stud rests when the window is swung. The seat 7 is provided with a guide 8 for guiding the stud 6, when the window sash is to be lifted out of or introduced into the fitting 1 of the window frame. Of the semicircular flanges the flange 5 is resilient and can be pressed against the flange 3. The device for effecting this consists of an adjustable attachment 9 for the resilient flange 5 which attachment is provided with a screw 10 for tightening the said flange. For the other bent end 12 of the flange 5 a rigid attachment 11 is provided on the fitting 2, and at the attachment 9 the flange 5 has a bent end portion 13. The inner end of the screw 10 is conical and against this conical portion the conical portion of a pin 13a rests, which is slidably arranged in the attachment 9 and the outer end of which, by changing the position of the conical portion of the screw 10, can, when required, adjust the resilient flange. On the fitting 2 of the window sash a rocking arm 14a is mounted on a pivot 14 the arm having frictional engagement. The rocking arm 14a has a circular flanged portion 15 and two end portions which have upwardly directed edges or flanges 16 and 17. In the fitting 1 of the window frame an adjusting pin 18 is provided, which is so disposed, that, when the fitting 2 of the window sash is turned from open to closed position, it will strike against the edge 17, whereby the portion 15 closes the outwardly facing opening of the seat 7, so that the stud 6 cannot be removed from the seat. When the fitting of the sash is turned from closed to open position, the adjusting pin 18 strikes against the edge 16, so that the portion 15 releases the opening of the seat 7 (Fig. 1), so that the sash can be lifted off the frame. Reference numeral 19 designates countersunk screw holes in the fittings by means of which these are attached to the window sash and the window frame respectively. Reference numeral 21 designates a resilient clamp secured to the flange 4 in the fitting 2 of the sash, said clamp being sufficiently resilient to tend to restrain pin 18 at the desired maximum position of opening of the sash. Upon actuation of the sash the resilient clamp 21 permits the pin 18 to pass by.

The invention is not restricted to the embodiment shown, but the details may be varied in several ways within the scope of the invention. The fitting 1 with the fixed flange 3 according to Figs. 1, 2, and 3 may be made in such a manner that a plate 22 (Figs. 9 and 10), which has a fixed circular flange 3a, is fixed to the plate of the fitting 1a (Figs. 9 and 10). Reference numeral 23 designates a washer mounted eccentricall on a tightening screw 24 threaded into the plate 22. In the plate 22 a slot 25 (Fig. 10) is provided through which a collar 26 bent up from the plate of the fitting 1a is passed, the lower round portion of the eccentrically mounted washer 23 resting against the said collar. Reference numerals 28 and 29 designate two guide slots lying above one another in the plate 22, in which guide slots rivets or screws 30 and 31 projecting from the plate of the fitting 1a are displaceable. The stud 6a and the adjusting pin 18a are also attached to the plate 22.

In Fig. 11 the rocking arm 14a is replaced by a plain pushing device or latch 32 which can be actuated by the adjusting pin 18, which strikes against an edge 33 on the latch, but only when the window sash is moved towards closed position, so that the latch 32 then closes the opening of the seat 7b which is limited in the outward direction by the flange 36. In the said latch a slot 34 is provided in which a screw 35 attached in the fitting 2b is movably arranged, so that the latch can move to and fro. When the opening of the seat is to be uncovered, if the window sash is to be removed, the latch is pushed back manually.

Of course the fittings may be interchanged, so that the fitting 2b with two flanges 4b and 5b is attached to the window frame, but a great advantage of the pivotal fittings according to the invention is to use the fittings in the way described in Figs. 1, 2, and 3, as then the most complicated fitting is fixed to the sash and not to the frame. That fitting that is intended for the frame is indeed of a simple construction and it is easy to rid it of mortar which may have fastened therein. The pivotal fitting also has the advantage that the sash can be lifted out in entirely turned position by a movement from below upwards, which is of great importance as far as heavy window sashes are concerned. The fitting with the adjusting device may be used for the sash as well as for the frame. The pivotal bearings may also be used for shutters, trap doors and the like.

The device according to Figs. 1, 2, and 3 functions in the following manner:

When the window is opened, the flanges 4 and 5 of the fitting 2 turn on either side of the flange 3 of the fitting 1, partly owing to the weight of the window sash, which is completely carried by the flanges 3, 4, and 5, and partly owing to the spring pressure exerted by the resilient flange 5. When the window sash is swung about 30°, the pin 18 engages the resilient clamp 21, so that a temporarily increased resistance to continued swinging of the window sash arises. The position of the window sash is now the predetermined position. When the window sash is swung further, the adjusting pin 18 is disengaged from the clamp 21 and actuates the rocking arm 14a, whereby the circular portion 15 of the latter, which has functioned as a bar for the stud 6 leaves room for the lifting-out of the window sash from the frame (see Figs. 1 and 2). When the window is closed, the circular portion 15 bars the stud 6 thereby that the rocking arm 14a actuates the adjusting pin 18. With the arrangement according to Figs. 9 and 10 any necessary after-adjustment can be obtained if the fitting has been incorrectly positioned or the sash has sunk relative to the frame, since the washer 23 may be released by unscrewing the screw 24, whereafter the said washer is turned and since it bears against the collar 26 and thus displaces the plate 22 on the plate of the fitting 1a, so that the position indicated by dashed lines of the flange 3a and the stud 6a is obtained whereby the sash attains its correct position in the frame. Now the screw 24 is tightened, whereby the washer 23 is locked.

What I claim is:

1. A bearing for horizontally or vertically pivoted window sash comprising, in combination, a first fitting adapted to be secured to a window frame, said fitting having a semicylindrical flange thereon, a second fitting adapted to be secured to the window sash and having two concentric semicylindrical flanges thereon, the radially outermost of said flanges on said sash fitting being positionable to frictionally engage the semicylindrical flange of the frame fitting, said semicylindrical flanges forming the sole support for the sash during movement from closed to substantially completely open position, a pin in said frame fitting, a semicylindrical bearing surface extending axially from said sash fitting at the center of curvature of said flanges, said bearing surface engaging the uppermost portion of said pin as the semicylindrical flanges approach disengaged position whereby in the open position the sash is carried entirely by the said pin, and said sash may be lifted off said pin to remove it from the frame.

2. A bearing as claimed in claim 1, wherein said outermost of said sash fitting flanges is resilient and means are provided to press at least one end of said resilient flange inwardly against the flange of said window fitting.

3. A bearing as claimed in claim 1, wherein a resilient clamp member is mounted on said sash fitting and a pin mounted on said window frame fitting engages said resilient clamp when the sash has been operated through a predetermined angle to thereby restrain the sash from movement and clamp it in the predetermined position.

4. A device according to claim 3, characterized in that a lever is mounted on said sash fitting within the innermost of said semicylindrical flanges, said lever having a flange portion extending axially in position to partially complete an enclosure about said frame fitting, said lever having axially extending flange portions, said clamp engaging pin cooperating with said flange portions to rock said lever and close said bearing enclosure when the sash is swung to closed position and to open said enclosure when the sash is swung to open position.

5. A device according to claim 4, wherein said bearing enclosure is completed by a flange of a rectilinearly movable member, said member being operated in a direction to complete said enclosure by means of said window fitting pin as said sash is moved to closed position, said member being manually moved in a direction to open said enclosure.

6. A bearing as claimed in claim 1, wherein said first fitting comprises a plate and a second plate adjustably mounted thereon, said second plate carrying said semicylindrical flange and said sash supporting pin and wherein means are provided for adjusting said second plate with respect to said fitting plate to thereby adjust the window after the fittings have been installed on the frame and the sash.

7. A device in accordance with claim 6, wherein said adjustment means comprises vertically extending slots in said second plate and an arcuate flange on said first plate and extending through a slot in said second plate, a washer eccentrically mounted on a pin fixed in said first plate and cooperating with said arcuate flange whereby said washer may be rotated to adjust the position of said first plate relatively to said second plate.

References Cited in the file of this patent

FOREIGN PATENTS

| | | |
|---|---|---|
| 143,870 | Sweden | Sept. 10, 1949 |
| 365,257 | Great Britain | Jan. 21, 1932 |
| 494,181 | Italy | May 17, 1954 |